United States Patent [19]

Blume et al.

[11] 4,125,335

[45] Nov. 14, 1978

[54] AGITATOR SYSTEM

[76] Inventors: Horst K. Blume, 3375 Hillcroft Rd., Huntingdon Valley, Pa. 19006; Adolf Erpel, 2303 Oakfield Rd., Warrington, Pa. 18976

[21] Appl. No.: 765,178

[22] Filed: Feb. 3, 1977

[51] Int. Cl.² .............................................. B01F 11/00
[52] U.S. Cl. .................................. 366/209; 241/175; 248/15; 248/22; 366/602
[58] Field of Search ................... 259/54, 72, DIG. 20, 259/2, 12, 29; 241/175; 51/7, 163.1, 163.2; 248/15, 18, 22

[56] References Cited

U.S. PATENT DOCUMENTS

| 2,846,201 | 8/1958 | Mermelstein | 259/72 |
| 3,583,647 | 6/1971 | Paterson | 259/54 |
| 3,679,184 | 7/1972 | Woodham et al. | 259/72 |
| 3,809,322 | 5/1974 | Hirosawa | 259/72 X |
| 3,985,307 | 10/1976 | Ebbert et al. | 259/DIG. 20 |

Primary Examiner—Philip R. Coe
Attorney, Agent, or Firm—Thomas M. Ferrill, Jr.

[57] ABSTRACT

An efficient agitator system capable of high speed agitation without excessive vibration is provided by use of an inclined-axis portion on a motor drive shaft and providing a driven oscillatory member coupled thereto with high speed bearing means and arranged to be agitated but not rotated about the drive shaft axis. A highly durable plastic flexing member is provided, one end being fixed relative to the drive motor and the opposite end being attached to the driven oscillatory member to flex outward and inward as the shaft rotates while restraining the oscillatory member against rotation. Transmitted vibration is minimized by resilient mounting of the base and by providing intersection of the motor shaft axis and the inclined axis substantially centrally within the driven oscillatory member.

6 Claims, 5 Drawing Figures

AGITATOR SYSTEM

The present invention relates to agitating machines, and is particularly concerned with high speed agitating equipment capable of energetically vibrating blood samples and other biological materials at high speed while keeping vibration to a minimum. Various forms of agitating systems are described in the United States, Russian and Italian patents listed below:

U.S. Pat. Nos.: Re. 26,555; 523,351; 856,619; 3,163,404; 3,422,577; 3,583,647; 3,785,529; 3,944,188; 3,985,307; Russian Pat. No. 253,758 Italian Pat. No. 554,336.

One arrangement of mechanical elements for providing agitation has involved use of an agitator element driven by an eccentric and provided with one or more stretched coil springs extending between the driven element and the base or a portion attached to the base. Such arrangements suffer from fatigue and fracture of the spring or springs, and also have other disadvantages including the limited stiffness available from the stretched spring configuration.

An object of the present invention is to provide an improved agitating system capable of high speed, energetic agitation of laboratory materials. Such a system is intended to be especially suitable for blood specimens and other materials dealt with in a biological laboratory.

A further object of the present invention is to provide an agitator system of high durability, relative freedom from transmitted vibration, and substantial restraint against rotation of the driven agitating member. These and other objects will be better understood from the following description of the invention, taken in connection with the drawings wherein.

Figure 1:
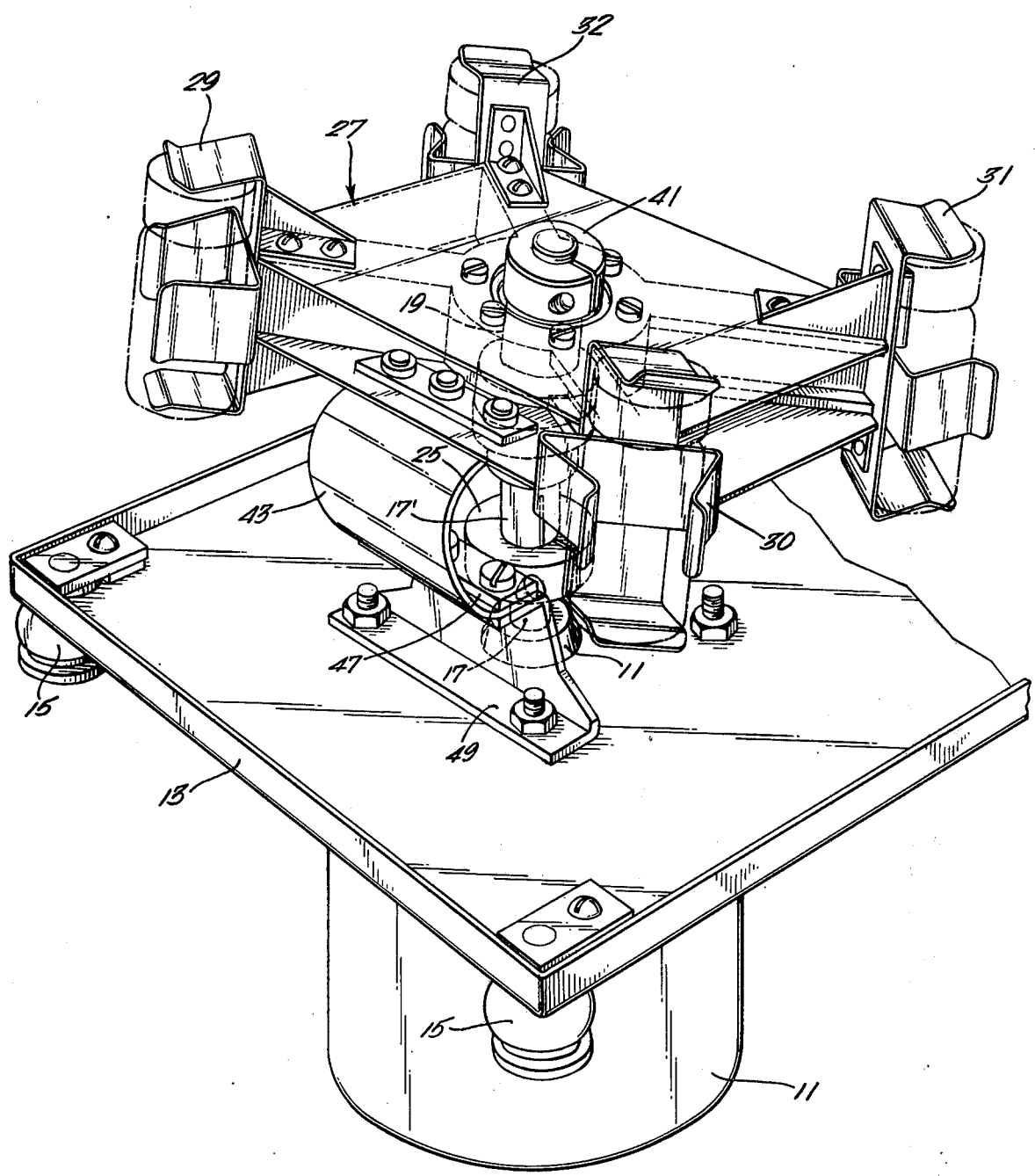
FIG. 1 is a general perspective view of the assembly of the motor, inclined axis driver, driven oscillatory member and the element used for damping and oscillatory restraint in the present invention.
Figure 2:
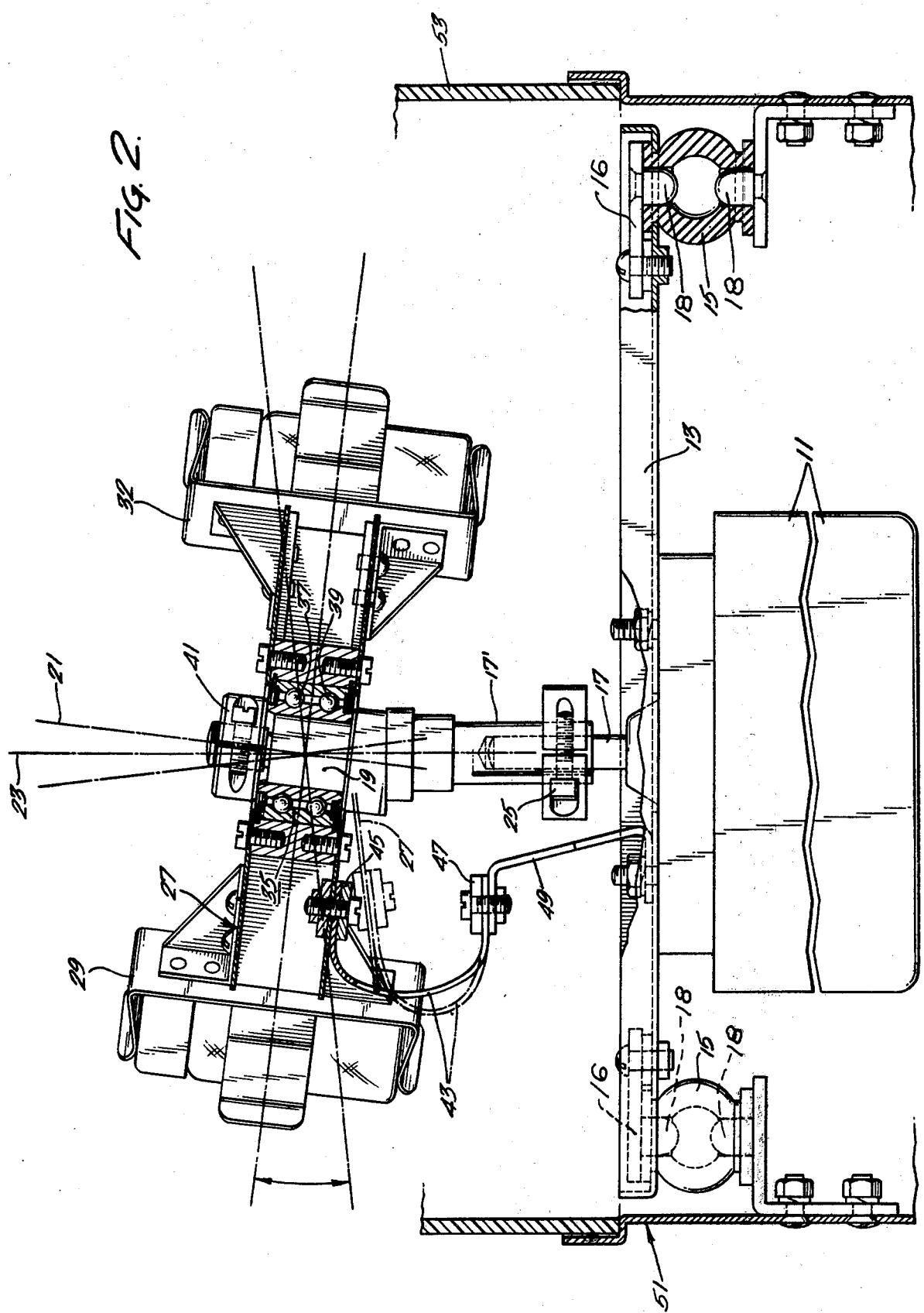
FIG. 2 is an elevation of the structure shown in FIG. 1, the central portion of the driven member being shown in section.

One embodiment of the invention is shown in perspective in FIG. 1 and in an elevation view, with parts shown in section, in FIG. 2.

Referring now to FIGS. 1 and 2, an electric motor 11 is shown suspended from a base unit 13 which is supported on vibration damping or shock mount means 15, 15. The shaft of the motor includes a first portion 17 coaxial with the motor's rotor bearings (not shown) and a further portion 19 (FIG. 2) having its axis 21 inclined relative to the motor's rotor axis 23. The axially aligned portion of the shaft system can be of unitary construction, or may preferably be made up of two portions, the smaller diameter portion 17 being part of the motor as manufactured and the portion 17' being a coaxial sleeve situated under the smaller diameter portion 17 and clamped thereto as shown at 25.

The oscillatory member to be driven by the motor system and the inclined axis shaft portion may consist of a plate structure 27 which may, for example, be made up of internal ribs and thin upper and lower surface portions. A plurality of receptacles 29, 30, 31 and 32 are provided on the oscillatory member 27, arranged to receive vessels such for example as vials of blood or other material to be agitated.

Referring to FIG. 2, at least one bearing unit 35 is provided in the oscillatory member 27 having its inner surface fixed upon the eccentric portion 19 of the motor drive shaft system. Preferably, the bearing arrangement may comprise either two ball bearings or a double race ball bearing arrangement having balls 37 and 39. A threaded and locked clamp 41 may be provided for clamping the inner race portion of the bearing arrangement in position on the inclined axis portion.

One advantageous arrangement involves having axes 21 and 23 intersect substantially at the central point within the oscillatory member 27. With such an arrangement, the center of this oscillatory member remains in one position while the peripheral regions of the member travel through oscillatory orbits.

In accordance with an important feature of the present invention, angular movement of the driven oscillatory member 27 relative to axis 23 (and axis 21) is kept to a minimum by a curved strap 43 of tough, resilient material as a polyurethane. In the illustrated embodiment, the polyurethane strap is approximately 1/16 thick, 1½ wide and 2¼ inches long. One end region of strap 43 is attached by means of a clamp member 45 and bolts to the driven oscillatory member 27, and the opposite end region of the strap 43 is similarly attached with clamp piece 47 to a bracket 49 extending upward from the base 13.

Vibration of the damping system is kept to a minimum by having the axes 21 and 23 intersect substantially centrally within the driven oscillatory unit 27, and the vibration transmitted to the motor 11 and base 13 may further be kept to a minimum by loading the member 27 with symmetrical loads of vials such as a pair of vials situated in two receptacles which are diametrically oppositely disposed relative to each other, e.g. receptacles 29 and 31, or by having one vial in each of the plural receptacles.

Damping of the vibration is contributed not only by the polyurethane strap 43 but also by the shock mount units 15, 15 which have middle bulbous portions of soft rubber material formed in barrel-like shapes, as shown in more detail in the cross-sectional view at the right in FIG. 2. These soft rubber shock mount units tend to absorb vibration and aid in preserving quietness of the system. Clamping means 16, 16 and center pins 18, 18 may be provided for securing the shock mounts 15, 15 in place.

In prior motor driven agitating systems, attempts have been made to utilize one or more coil springs under tension extending between an oscillatory driven member and the motor or bearing, but such springs are not as effective as the tough flexible strap 43 of the present invention in providing restraint against appreciable angular movement about the drive shaft axis. Moreover, they are more susceptible of failure due to fatigue, in contrast to the high durability of the polyurethane strap arrangement of the present invention.

Figure 3:
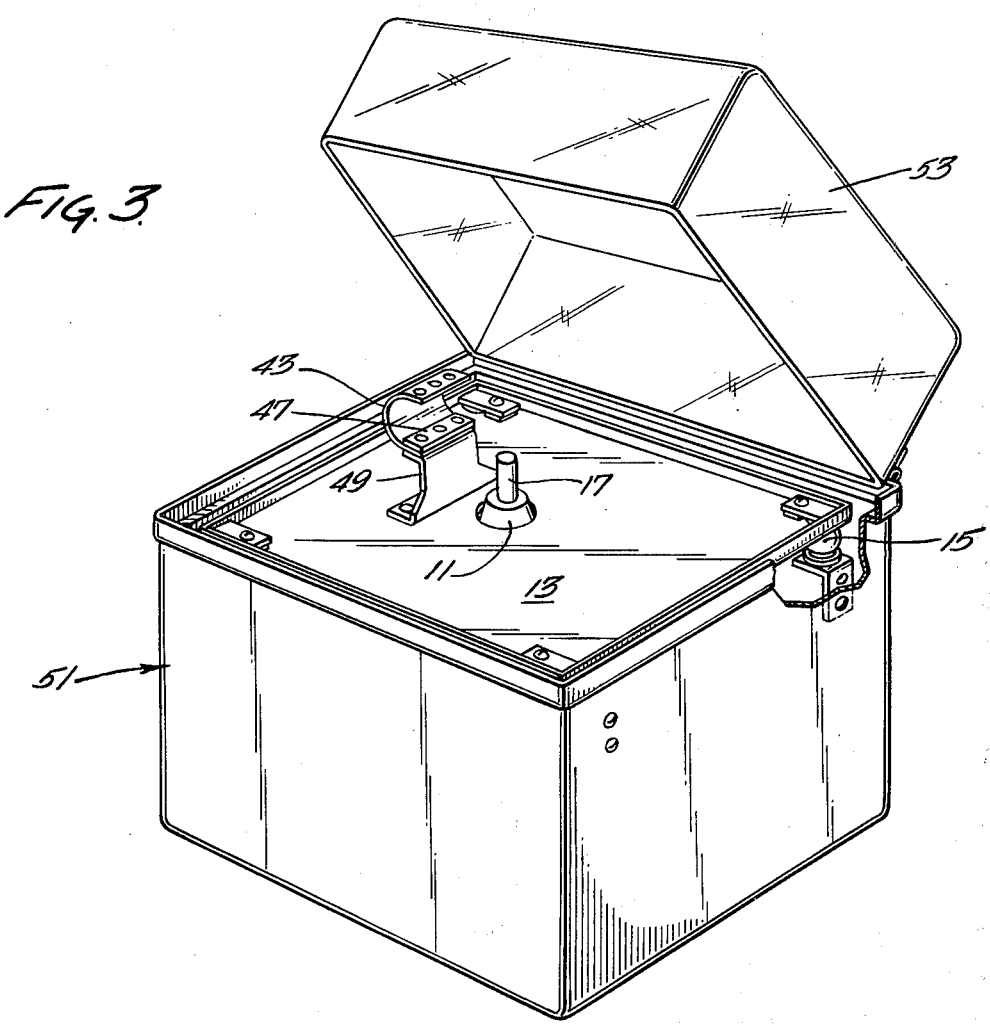
FIG. 3 is an illustration of suitable housing means for the apparatus in FIGS. 1 and 2.

Preferably, the apparatus shown in FIG. 1 may be housed in an enclosing cabinet 51 which may, if desired, have a hinged box-like protective cover 53. The cover 53 preferably is made of a transparent plastic material to allow observation of the action. Such an arrangement is shown in FIG. 3, most upper portions of the unit being omitted for clarity. The lower ends of the shock mount units 15 may be supported on corner brackets in the corners of cabinet 51 or angle stock therefor may be bonded to the inner walls of the cabinet, stiffening it as well as providing support for the shock mounts.

While a base plate 13 attached to the end of motor 11 has been shown as a convenient means for supporting the motor 11 and bracket 49, this base plate 13 in turn resting upon the shock mount units 15, 15, it will be appreciated that it is not necessary to have a separate top plate 13, since the end plate of the motor 11 may itself be relied on, with or without brackets or other convenient means on the body of the motor for attachment to the ends of shock mounts 15, 15.

The motor 11 may be arranged to rotate at a speed as high as 3500 revolutions per minute, or even higher. Operating at such a speed, the system's action is quite smooth, its effect being pronounced and yielding the intended results in a very short agitation time, in contrast to other, less effective agitator systems. Among the uses for this system are: vial and test tube mixing, denaturation studies of protein, detection of unstable H$b$, extractions with PCA or solvents, oxidation-reduction tests, removal of protein, and the Asakura "Sickle-Shake" test.

The efficiency achieved with smoothness of operation is related to the orbital action imparted to the vessels such as vials (shown in phantom) held in the receptacles of the driven oscillatory member 27. In the case of a vial in any given receptacle, its center is caused to travel through a substantially elliptical orbit once per revolution of the motor shaft, the major axis of the ellipse being approximately vertical (assuming the cabinet 51 to be resting on a horizontal table top or laboratory counter), and the minor axis being approximately horizontal and of the order of one-third as great as the major axis of the substantial ellipse. The dimensions of the major and minor axes may be of the order of ¾ inch and ¼ inch respectively.

While the center of a vial is traversing its substantially elliptical orbit some 25 times or more per second (assuming a motor speed of 3500 R.P.M. or greater), the upper and lower ends of the vial are being caused to traverse more extensive and somewhat more complex orbits which combine aspects of FIG. 8 and elliptical orbits. The result is a very efficient agitative action achieved without the excessive vibration or disturbance which would be objectionable in a medical facility or a biological or other scientific laboratory.

It will be understood that with a unit such as the unit of FIGS. 1 and 2, the angular restraint and damping means for each oscillatory member may take the form shown in FIGS. 1 and 2 or may consist of one or more pairs of such units, each pair having two oppositely-disposed curved straps of the durable plastic material for which polyurethane is suitable. A still greater number of separate straps may be disposed about the motor axis if desired.

Figure 4:
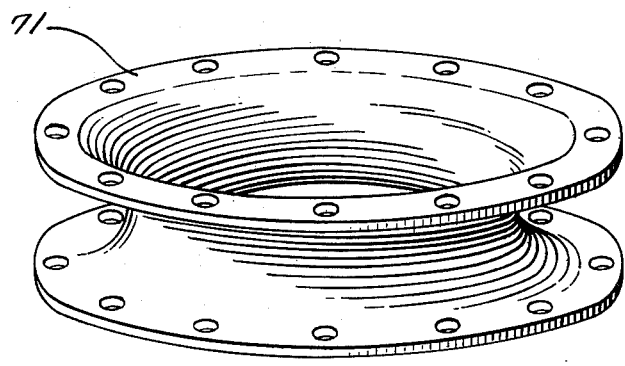
FIG. 4 is an oblique view of a plastic damping and restraint member in the form of a figure of a revolution.
Figure 5:
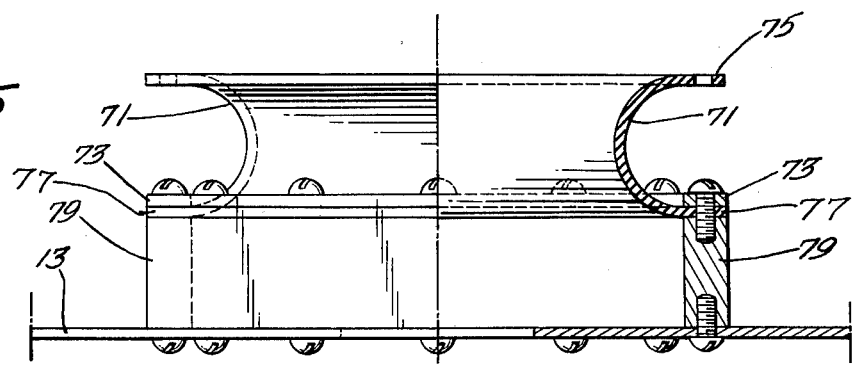
FIG. 5 is an elevation, partly in section, of the figure of revolution damping and restraint member as supported by suitable support means on the machine base.

Alternatively, the angular restraint and damping means for such oscillatory member may be formed as a figure of revolution about the motor axis. One example is shown in FIGS. 4 and 5. A tough, resilient plastic member 71 is formed into a figure of revolution corresponding approximately to the inner half of a toroid. While the outer half of a toroid could be used, outwardly presenting a convex surface, it would be less convenient to assemble and disassemble. Use of resilient restraint and damping means in the semi-toroid form 71 preferably involves using either multiple arcuate clamp pieces or clamp pieces formed as rings exemplified by lower clamp ring 73 (FIG. 5), the upper clamp ring being omitted for clarity of illustration. The upper rim portion 75 of the semi-torus is for attachment to the bottom of the driven oscillatory member 27 (FIG. 1), and the lower rim portion 77 is for attachment either to the base plate 13 or to a figure-of-revolution bracket or cylinder 79 extending upward from said base plate 13.

As will be readily apparent, the receptacles for holding vials or test tubes or other vessels may take other forms than those shown in FIGS. 1 and 2, and they may be provided in greater or lesser number than the four receptacles shown. For realizing in combination maximum smoothness and maximum loading capacity, a substantial number of the receptacles may be evenly distributed about the central axis of the system and may all be approximately equally loaded. Where less than full capacity is being used, a plurality of vials or other vessels may be positioned in receptacles diametrically opposite each other. However, the illustrated system has been proven to yield excellent results even when there is substantial eccentricity of loading, e.g. where only one vial is being agitated, or where two or three vials are positioned as to produce unbalanced loading of the system.

While in the foregoing there has been disclosed a preferred embodiment of the invention, it should be understood that various changes and modifications can be made within the true spirit and scope of the invention as recited in the appended claims.

What is claimed is:

1. A motor driven agitator system comprising:
 a drive motor having a rotatable output shaft, said shaft including a first portion extending from said motor and a second portion extending from said first portion at an oblique angle thereto; agitator means carried on said second portion of said shaft, said agitator means including a supporting means and at least one receptacle holding means fixedly attached to said supporting means and radially spaced from said first portion of said shaft, bearing means between said agitator means and said second portion of said shaft, said bearing means including a first portion carried by said supporting means and a second portion fixed to said second portion of said shaft for rotation therewith whereby said second portion of said shaft and said second portion of said bearing means can rotate relative to said supporting means and said first portion of said bearing means; and,
 resilient means made of tough flexible plastic material fixed at one end to said supporting means and at the other end to a fixed support for restraining rotational movement of said supporting means and said receptacle holding means about the axes of said shaft, said resilient means being flexible in a direction substantially parallel to the axes of said first portion of said shaft so that when said shaft is rotating said receptacle holding means oscillates in a plane substantially parallel to the axis of said first portion of said shaft.

2. A motor driven agitator system in accordance with claim 1 wherein said resilient means has its ends in a plane substantially perpendicular to the plane in which the longitudinal axis of said first portion of said shaft is contained, said ends being connected by an arcuate portion.

3. A motor driven agitator system in accordance with claim 2 wherein said resilient means is in the form of a figure of revolution.

4. A motor driven agitator system in accordance with claim 2 wherein said resilient means is in the form of a strap.

5. A motor driven agitator system in accordance with claim 1 wherein the axes of said first and second portions of said shaft intersect at a point substantially centrally located with respect to said supporting means.

6. A motor driven agitator system in accordance with claim 1 including a plurality of shock mounting means for supporting said motor, each of said shock mounting means including barrel shaped members made of soft resilient material.

* * * * *